(12) United States Patent
Moro

(10) Patent No.: US 7,266,640 B2
(45) Date of Patent: Sep. 4, 2007

(54) MEMORY CARD AUTHENTICATION SYSTEM, CAPACITY SWITCHING-TYPE MEMORY CARD HOST DEVICE, CAPACITY SWITCHING-TYPE MEMORY CARD, STORAGE CAPACITY SETTING METHOD, AND STORAGE CAPACITY SETTING PROGRAM

(75) Inventor: Hiroyuki Moro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/734,511

(22) Filed: Apr. 12, 2007

(65) Prior Publication Data
US 2007/0181700 A1 Aug. 9, 2007

Related U.S. Application Data

(63) Continuation of application No. 11/313,780, filed on Dec. 22, 2005, which is a continuation of application No. 10/647,291, filed on Aug. 26, 2003, now Pat. No. 7,159,075.

(30) Foreign Application Priority Data

Aug. 26, 2002 (JP) ............................. 2002-245875

(51) Int. Cl.
*G06F 12/00* (2006.01)
*G11C 5/00* (2006.01)
(52) U.S. Cl. ...................... 711/115; 235/492
(58) Field of Classification Search ........... 711/115, 711/170, 171, 173; 235/492
See application file for complete search history.

(56) References Cited

U.S. PATENT DOCUMENTS

| 5,383,147 | A  | 1/1995  | Sanemitsu |
| 7,143,237 | B2 | 11/2006 | Suda |

FOREIGN PATENT DOCUMENTS

| JP | 5-100802     | 4/1993  |
| JP | 05-274120    | 10/1993 |
| JP | 06-095979    | 4/1994  |
| JP | 07-141479    | 2/1995  |
| JP | 07-302175    | 11/1995 |
| JP | 11-085575    | 3/1999  |
| JP | 2000-353226  | 12/2000 |
| JP | 2001-043333  | 2/2001  |
| JP | 2001-325127  | 11/2001 |
| JP | 2002-041341  | 2/2002  |
| JP | 2002-189993  | 7/2002  |
| WO | WO 02/05285  | 1/2002  |

*Primary Examiner*—Jack Lane
(74) *Attorney, Agent, or Firm*—Oblon, Spivak, McClelland, Maier & Neustadt, P.C.

(57) ABSTRACT

A system for authenticating a memory card including: a capacity switching-type memory card host device including a capacity switch notification module which notifies a memory card targeted for exchanging information that the capacity switching-type memory card host device handles a capacity switching-type memory card, and a capacity switch authentication module which authenticates whether the targeted memory card is the capacity switching-type memory card; a capacity switching-type memory card including a capacity switching-type controller which flags the large-capacity expression register use flag on receipt of notification of being the capacity switching-type memory card host device; and a bus which transmits and receives data between the capacity switching-type memory card host device and the capacity switching-type memory card.

12 Claims, 6 Drawing Sheets

MEMORY CARD AUTHENTICATION SYSTEM, CAPACITY SWITCHING-TYPE MEMORY CARD HOST DEVICE, CAPACITY SWITCHING-TYPE MEMORY CARD, STORAGE CAPACITY SETTING METHOD, AND STORAGE CAPACITY SETTING PROGRAM

CROSS REFERENCE TO RELATED APPLICATIONS

This application is a continuation and is based upon and claims the benefit of priority under 35 USC §120 from U.S. application Ser. No. 11/313,780, filed Dec. 22, 2005, which is a continuation of U.S. application Ser. No. 10/647,291, filed Aug. 26, 2003, now U.S. Pat. No. 7,159,075, and under 35 USC §119 from Japanese Patent Application P2002-245875 filed on Aug. 26, 2002; the entire contents of which are incorporated by reference herein.

BACKGROUND OF THE INVENTION

1. Field of the Invention

The present invention relates to a memory card authentication system, a capacity switching-type memory card host device, a capacity switching-type memory card, a storage capacity setting method, and a storage capacity setting program, which are capable of adopting a conventional capacity expression with an internal register and a new capacity expression and are capable of using a plurality of capacity expressions while switching the capacity expressions.

2. Description of the Related Art

A memory card containing a rewritable nonvolatile memory, which does not lose information saved therein even if a power supply is turned off, is a storage device for saving digital information for a device for controlling the digital information, such as a digital camera, a portable music player or a personal digital assistance (such a device will be hereinafter referred to as a "memory card host device"). Such a memory card includes a register for indicating a storage capacity; however, the momentum of increases in memory size will soon surpass the capacity which the register can express.

There are disclosed some technologies related to memory cards, such as a recording device which includes two memory cards in order to physically increase a storage capacity (Japanese Patent Application Laid-open No. 2001-325127).

It is necessary to consider a new method for expressing a storage capacity in order to increase a capacity of a memory card. However, when a current register is simply replaced, such a capacity switching-type memory card cannot be used with a conventional memory card host device.

SUMMARY OF THE INVENTION

A first aspect of the present invention is to provide a system for authenticating a memory card, comprising: a) a capacity switching-type memory card host device including a capacity switch notification module which notifies a memory card targeted for exchanging information that the capacity switching-type memory card host device handles a capacity switching-type memory card, and a capacity switch authentication module which refers to a state of a large-capacity expression register use flag of the targeted memory card and authenticates whether the targeted memory card is the capacity switching-type memory card; b) a capacity switching-type memory card including a capacity switching-type controller which flags the large-capacity expression register use flag on receipt of notification of being the capacity switching-type memory card host device, the large-capacity expression register use flag indicating use of a large-capacity expression register which retains information with a capacity exceeding a capacity which can be expressed by an internal register; and c) a bus which transmits and receives data between the capacity switching-type memory card host device and the capacity switching-type memory card.

A second aspect of the present invention is to provide a host device exchanging information with a memory card in a memory card authentication system, the host device, comprising: a) a capacity switch notification module which notifies a memory card targeted for exchanging information that the host device handles a capacity switching-type memory card; and b) a capacity switch authentication module which refers to a state of a large-capacity expression register use flag of the targeted memory card and authenticates whether the targeted memory card is the capacity switching-type memory card.

A third aspect of the present invention is to provide a memory card, comprising: a) a capacity switching-type internal storage element including a plurality of storage areas, a master boot sector which retains file information on each of the plurality of storage areas, an internal register which retains capacity information on each of the plurality of storage areas, a large-capacity expression register which retains information with a capacity exceeding a capacity which can be expressed by the internal register, and a large-capacity expression register use flag which indicates use of the large-capacity expression register; and b) a capacity switching-type controller which flags the large-capacity expression register use flag upon notification that a memory card host device targeted for exchanging information is a capacity switching-type memory card host device capable of using a plurality of capacity expressions while switching between the capacity expressions.

A forth aspect of the present invention is to provide a method for setting a storage capacity in a host device exchanging information with a memory card, the method, comprising: a) initializing the memory card; b) obtaining information on an internal register of the memory card; c) judging whether the memory card can use a plurality of capacity expressions while switching between the capacity expressions; d) authenticating a capacity expression of the internal register of the memory card when the memory card is incapable of using the plurality of capacity expressions by switching between the capacity expressions; and e) using a capacity expressed by the internal register.

A fifth aspect of the present invention is to provide a method for setting a storage capacity in a host device exchanging information with a memory card, the method, comprising: a) initializing the memory card; b) obtaining information on an internal register of the memory card; c) judging whether the memory card can use a plurality of capacity expressions while switching between the capacity expressions; d) authenticating a capacity expression of a large-capacity expression register of the memory card when the memory card can use the plurality of capacity expressions by switching between the capacity expressions; and e) using a capacity expressed by the large-capacity expression register.

A sixth aspect of the present invention is to provide a storage capacity setting computer program product to be executed by a host device, the host device exchanging information with a memory card in a memory card authentication system, the computer program product, comprising: a) instructions for the host device to initialize the memory card; b) instructions for the host device to obtain information on an internal register of the memory card; c) instructions for the host device to judge whether the memory card can use a plurality of capacity expressions while switching between the capacity expressions; d) instructions for the host device to authenticate a capacity expression of the internal register of the memory card when the memory card is incapable of using the plurality of capacity expressions by switching between the capacity expressions; and e) instructions for the host device to use a capacity expressed by the internal register.

A seventh aspect of the present invention is to provide a storage capacity setting computer program product to be executed by a host device, the host device exchanging information with a memory card in a memory card authentication system, the computer program product, comprising procedures for: a) instructions for the host device to initialize the memory card; b) instructions for the host device to obtain information on an internal register of the memory card; c) instructions for the host device to judge whether the memory card can use a plurality of capacity expressions while switching between the capacity expressions; d) instructions for the host device to authenticate a capacity expression of a large-capacity expression register of the memory card when the memory card can use the plurality of capacity expressions by switching between the capacity expressions; and e) instructions for the host device to use a capacity expressed by the large-capacity expression register.

DETAILED DESCRIPTION OF THE INVENTION

Figure 1:
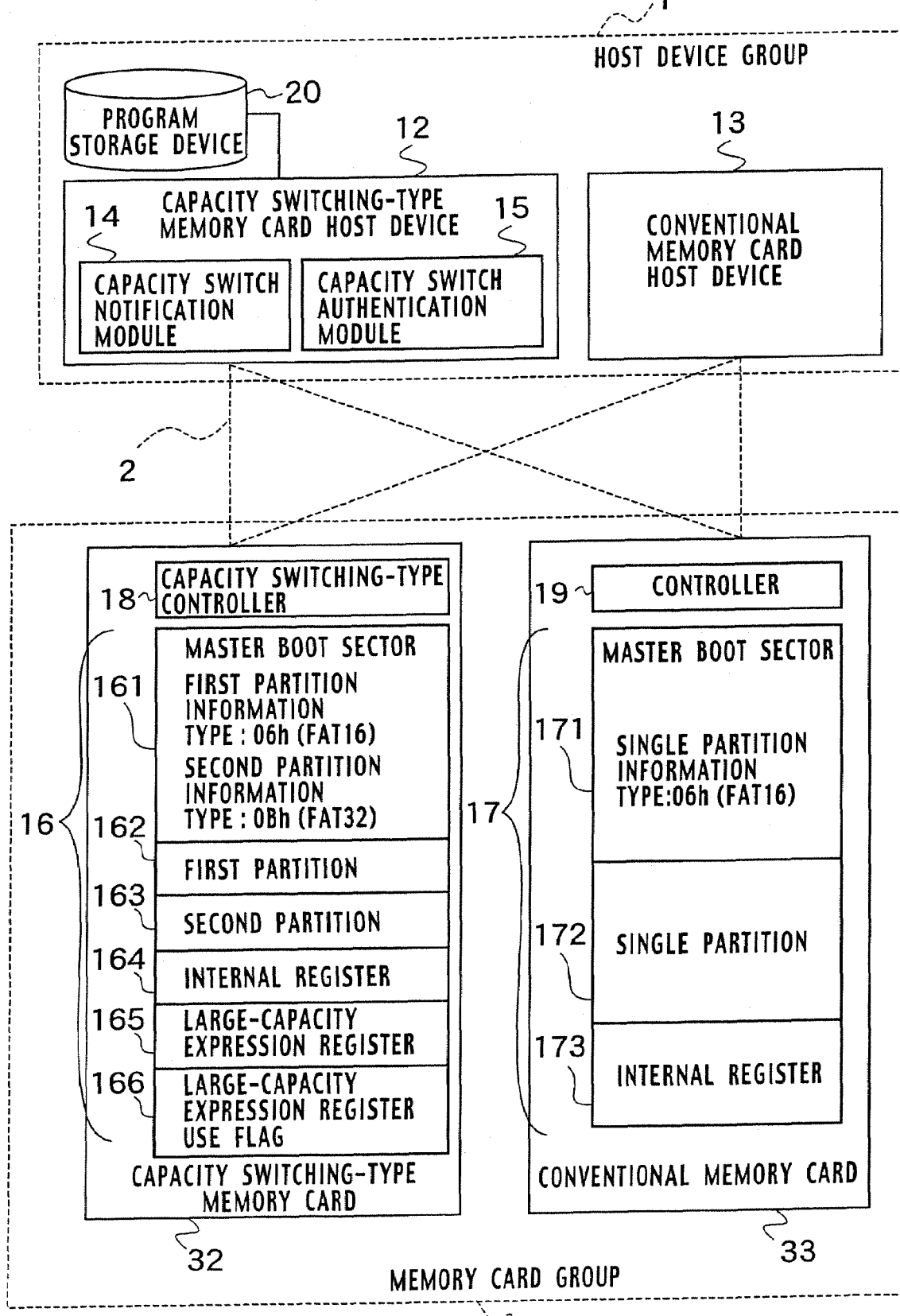
FIG. 1 is a block diagram showing a configuration of a memory card authentication system according to the embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

As shown in FIG. 1, a memory card authentication system according to the embodiment of the present invention includes a host device group 1 having two types of memory card host devices which are a capacity switching-type memory card host device 12 and a conventional memory card host device 13; a memory card group 3 which exchanges information with the host device group 1; and a bus 2 for transmitting and receiving data between the host device group 1 and the memory card group 3.

The capacity switching-type memory card host device 12 includes a capacity switch notification module 14 which notifies to a memory card targeted for information exchange that the capacity switching-type memory card host device handles a capacity switching-type memory card designed to switch a plurality of capacity expressions, and a capacity switch authentication module 15 which refers to a state of a large-capacity expression register use flag 166 of the targeted memory card and thereby authenticates whether or not the targeted memory card is the capacity switching-type memory card 32. Here, the "capacity expression" refers to a method of expressing a capacity of a storage area which the memory card has. The capacity switching-type memory card host device 12 includes a central processing unit (CPU), and may adopt such a configuration as to incorporate the capacity switch notification module 14, the capacity switch authentication module 15. These modules can be realized by executing a dedicated program for utilizing a given programming language. Moreover, the capacity switching-type memory card host device 12 may include a program storage device 20 which saves a storage capacity setting program for causing the capacity switch notification module 14 and the like to execute functions thereof. It is possible to allow the capacity switching-type memory card host device 12 to execute a procedure for obtaining information on an internal register of the memory card and a procedure for authenticating the register of the memory card by means of reading the storage capacity setting program from the program storage device 20. The program storage device 20 may be an internal storage device such as a random access memory (RAM), or an external storage device such as a hard disk (HD) or a flexible disk (FD). It is easy to save, carry and sell a program by use of the storage device which saves the above-described program. Specifically, the memory card host device to be included in the host device group 1 may be a digital camera, a portable music player, a personal digital assistance, a car navigation system, a cellular telephone, a silicon audio player, an electronic dictionary, or the like.

The capacity switching-type memory card host device 12 according to the embodiment of the present invention adopts a capacity expression by a conventional internal register and a new capacity expression, and uses a plurality of the capacity expressions while switching between the capacity expressions. Thus, the capacity switching-type memory card host device 12 can handle a plurality of memory cards with different characteristics. Moreover, since the capacity switching-type memory card host device 12 can handle both the capacity switching-type memory card 32 and a conventional memory card 33, the capacity switching-type memory card host device 12 can maintain compatibility.

The memory card group 3 includes two types of memory cards, the capacity switching-type memory card 32 of the present invention and the conventional memory card 33.

The conventional memory card 33 includes at least a fixed capacity-type internal storage element 17 and a controller 19. The fixed capacity-type internal storage element 17 includes a master boot sector 171 which retains single partition information, a single partition 172 which is a storage area, and an internal register 173 which retains storage capacity information. The single partition information, which is the information on the single partition 172, is retained in the master boot sector 171. In FIG. 1, since the single partition 172 applies the FAT 16 file system, a partition type thereof is described as 06h. The controller 19 receives a command and data to the memory card group 3 from a particular memory card host device in the host device group 1 through the bus 2, and controls the storage area based on the command and the data. Moreover, the controller 19 also responds to the command from the particular memory card host device in the host device group 1 and transmits data.

The capacity switching-type memory card 32 includes a capacity switching-type internal storage element 16 and a capacity switching-type controller 18. The capacity switching-type internal storage element 16 includes a master boot sector 161 which retains first and second partition information, a first partition 162 which is a first storage area, a second partition 163 which is a second storage area, an internal register 164 which retains storage capacity information, a large-capacity expression internal register 165 which retains information with a capacity exceeding a capacity that can be expressed by the internal register, and the large-capacity expression register use flag 166 which indicates that the large-capacity expression internal register 165 is being used. In FIG. 1, since the first partition 162 applies the FAT 16 file system, a partition type thereof is described as 06h. Meanwhile, since the second partition 163 applies the FAT 32 file system, a partition type thereof is described as 0Bh. The capacity switching-type controller 18 receives a command and data to the capacity switching-type memory card 32 from a particular memory card host device in the host device group 1 through the bus 2, and controls the storage areas based on the command and the data. Moreover, the capacity switching-type controller 18 also responds to the command from the particular memory card host device in the host device group 1 and transmits data. Furthermore, the capacity switching-type controller 18 flags the large-capacity expression register use flag 166 on receipt of notification that the particular host device is the capacity switching-type memory card host device 12. In addition, when the capacity switching-type controller 18 is used in combination with the conventional memory card host device 13, the capacity switching-type controller 18 changes the information on a partition which is retained in the master boot sector 161 and might be (or can be) authenticated by the conventional memory card host device 13, in a manner of hiding the information from the conventional memory card host device 13. This changing function will be described later in detail.

The memory card included in the memory card group 3 specifically has dimensions of 24×32×2.1 mm and a copyright protection function compliant with the secure digital music initiative (SDMI) standard. The memory card is, for example, a secure digital (SD) memory card, which has upper compatibility with a multimedia card (MMC). The SD memory card is a memory card, based on the SDMI standard, which has been jointly developed by Toshiba Corporation, Matsushita Electric Industrial Co., Ltd., and SanDisk Corporation. In the SD memory card, the internal register is referred to as a CSD register. The SD memory card basically applies the FAT 16 file system which is defined by ISO/IEC 9293.

The capacity switching-type memory card 32 of the present invention adopts the capacity expression by the conventional internal register and the new capacity expression, and uses the plurality of capacity expressions while switching between the capacity expressions. In this way, it is possible to handle a large capacity. Moreover, the capacity switching-type memory card 32 of the present invention can be handled by both the capacity switching-type memory card host device 12 and the conventional memory card host device 13. Accordingly, the capacity switching-type memory card 32 can maintain compatibility.

As shown in FIG. 1, the memory card authentication system according to the embodiment of the present invention can be applied to any combination of: the capacity switching-type memory card host device 12 and the capacity switching-type memory card 32; the capacity switching-type memory card host device 12 and the conventional memory card 33; and the conventional memory card host device 13 and the capacity switching-type memory card 32.

Figure 2:
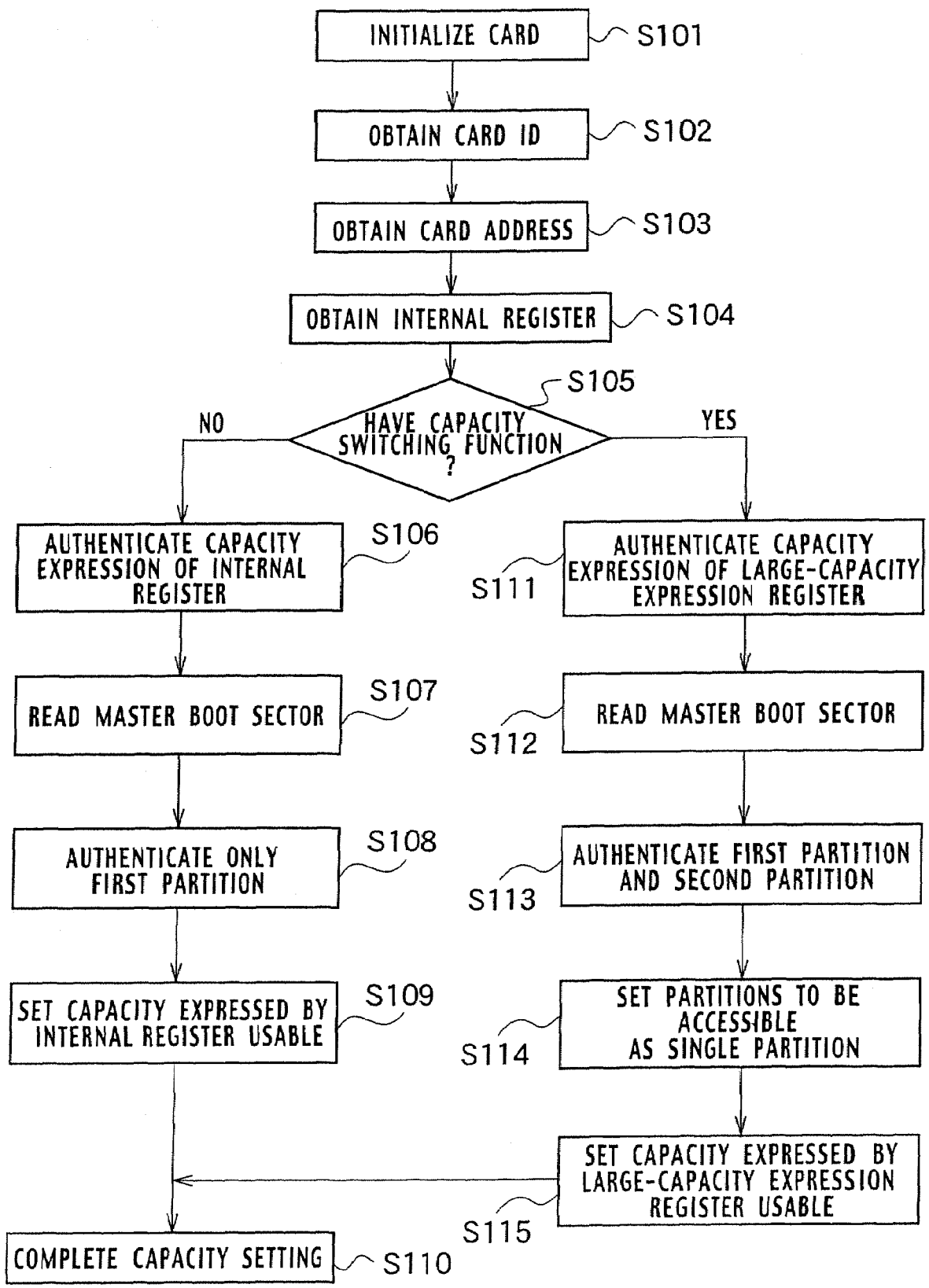
FIG. 2 is a flowchart showing a storage capacity setting method according to the embodiment of the present invention.

Next, a storage capacity setting method for a memory card host device according to the embodiment of the present invention will be described by use of FIGS. 1 and 2.

a) First, in Step S101 in FIG. 2, a particular memory card host device in the host device group 1 issues an initialization command and thereby initializes a particular memory card in the memory card group 3. When the particular memory card host device is the capacity switching-type memory card host device 12, the capacity switch notification module 14 notifies the particular memory card that the particular memory card host device is the capacity switching-type memory card host device 12 as an argument of the initialization command. For example, the initialization command to the SD memory card consists of a command length of 48 bits, 6 bits of which are used for the contents of the command, and 32 bits of which are used for the argument. The information that the particular memory card host device is the capacity switching-type memory card host device 12 may use an unused area in the 32-bit argument. When the particular memory card, which receives the notification that the particular memory card host device is the capacity switching-type memory card host device 12, is the capacity switching-type memory card 32, the capacity switching-type controller 18 of the capacity switching-type memory card 32 flags the large-capacity expression register use flag 166. The initialization command used in Step S101 may apply a command which has already been applied to the SD memory card or the like. Alternatively, it is also possible to add a new command.

b) Next, in Step S102, the particular memory card host device in the host device group 1 obtains a card ID, such as a serial number or a date of manufacture, of the particular memory card in the memory card group 3. Thereafter, in Step S103, the particular memory card host device obtains a card address. The card address is used for identifying the positions of a plurality of memory cards when the plurality of memory cards are inserted in the memory card host device, for example.

c) Next, in Step S104, the particular memory card host device in the host device group 1 issues an internal register information retrieval command to recognize the capacity of the particular memory card in the memory card group 3. When the particular memory card is the capacity switching-type memory card 32, the capacity switching-type controller 18 of the capacity switching-type memory card 32 notifies the state of the large-capacity expression register use flag 166 to the memory card host device as part of a response to the information retrieval command. In the case of the SD card, for example, of the response to the information retrieval command, 6 bits are used for the contents of the command and 127 bits or 32 bits are used for an argument.

Figure 6:
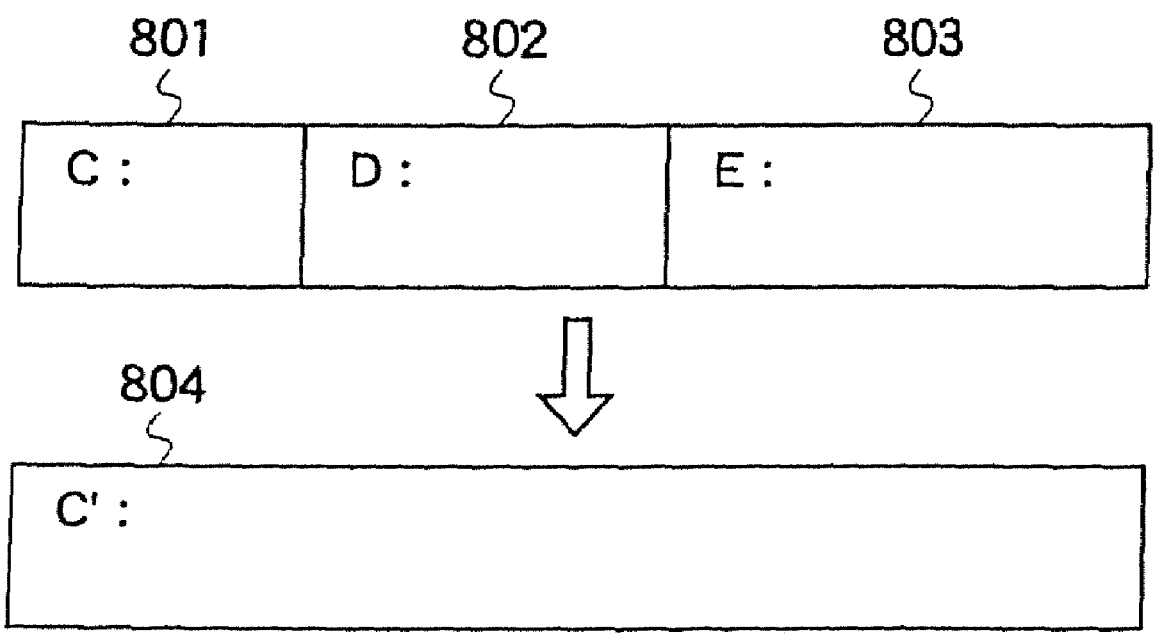
FIG. 6 is a view showing an example of a method of qualifying a plurality of partitions as a single partition.
Figure 7:
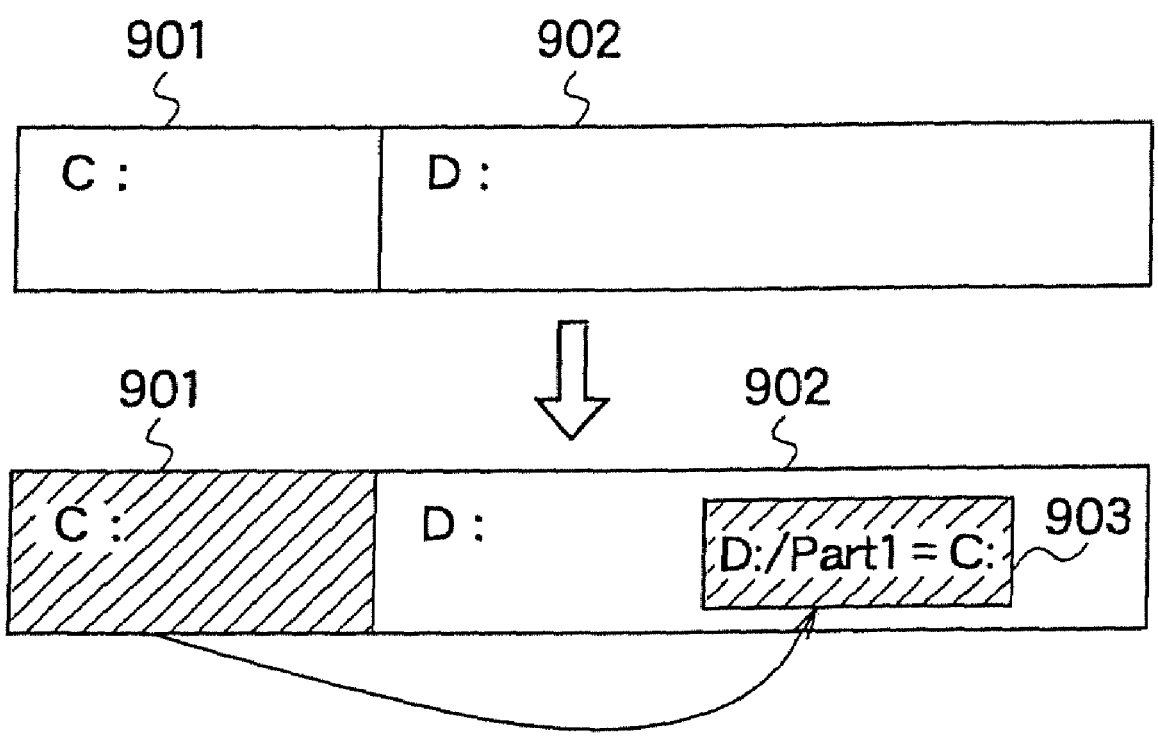
FIG. 7 is a view showing another example of a method of qualifying a plurality of partitions as a single partition.

The state of the large-capacity expression register use flag 166 may use an unused area in the 127-bit or 32-bit argument. When the memory card host device is the capacity switching-type memory card host device 12, the capacity switch authentication module 15 of the capacity switching-type memory card host device 12 refers to the state of the large-capacity expression register use flag 166 and thereby authenticates that the particular memory card is the capacity switching-type memory card 32. When the particular memory card host device is the conventional memory card host device 13, the particular memory card host device naturally cannot refer to the large-capacity expression register use flag 166. The information retrieval command used in Step S104 may apply a command which has been already applied to the SD memory card or the like. Alternatively, it is also possible to add a new command.

d) Next, in Step S105, a judgment is made as to whether or not the particular memory card in the memory card group 3 is the capacity switching-type memory card 32. When the particular memory card is the conventional memory card 33, the response to the internal register information retrieval command shows a state that the large-capacity expression register use flag 166 is not flagged. Accordingly, the capacity switching-type memory card host device 12 can judge whether the particular memory card is the capacity switching-type memory card 32. In the case of the conventional memory card host device 13, every memory card is authenticated as the conventional memory card 33 because the conventional memory card host device 13 cannot refer to the large-capacity expression register use flag 166.

e) When the judgment is made as "corresponding to capacity switch" in Step S105, in other words, when the particular memory card host device in the host device group 1 is the capacity switching-type memory card host device 12 and the particular memory card in the memory card group 3 is the capacity switching-type memory card 32, the process advances to Step S111. The capacity switching-type memory card host device 12 then reads the large-capacity expression register 165 from the capacity switching-type memory card 32. Next, in Step S112, the capacity switching-type memory card host device 12 reads the master boot sector 161. Thereafter, in Step S113, the capacity switching-type memory card host device 12 authenticates that the first partition 162 and the second partition 163 exist in the capacity switching-type memory card 32 by use of the first partition information and the second partition information.

f) Next, in Step S114, the capacity switching-type memory card host device 12 performs a setting to make the first partition 162 and the second partition 163 accessible as a single partition. User access is facilitated by qualifying the first partition 162 and the second partition 163 collectively as the single partition. Concrete examples of the method for setting of the single partition are shown in FIG. 6 and FIG. 7. FIG. 6 shows a method of logically connecting three partitions of C: 801, D: 802, and E: 803 and thereby qualifying these three partitions collectively as a single partition C': 804. FIG. 7 shows a method applied to two partitions of C: 901 and D: 902, in which C: 901 is qualified as a file D:/Part 1903 included in D: 902, so as to make the two partitions accessible as a single partition. Access is facilitated by these methods. Next, in Step S115, the capacity switching-type memory card host device 12 sets the capacity expressed by the large-capacity expression register 165 usable, and the capacity setting process is completed in Step S110.

g) If the judgment is made as being "not corresponding to capacity switch" in Step S105, the combination is any of the following three combinations: the conventional memory card host device 13 and the capacity switching-type memory card 32; the capacity switching-type memory card host device 12 and the conventional memory card 33; and the conventional memory card host device 13 and the conventional memory card 33. The combination of the conventional memory card host device 13 and the conventional memory card 33 represents a conventional operation. Accordingly, description thereof will be omitted.

In the case of the combination of the conventional memory card host device 13 and the capacity switching-type memory card 32, the process advances to Step S106. The conventional memory card host device 13 authenticates every card as the conventional memory card 33 because the conventional memory card host device 13 cannot refer to the large-capacity expression register use flag 166 included in the response to the internal register information retrieval command received in Step S104. Therefore, in Step S106, the capacity expression of the internal register 164 is authenticated. The conventional memory card host device 13 reads the internal register 164 out of the capacity switching-type memory card 32. Next, in Step S107, the conventional memory card host device 13 reads the master boot sector 161. Here, in Step S108, the capacity switching-type controller 18 of the capacity switching-type memory card 32 modifies the second partition information in the master boot sector 161 and transmits the information so that the conventional memory card host device 13 recognizes the existence of only the first partition 162. The method for modifying the second partition information will be described later in detail together with the detail of the capacity switching-type controller 18. In Step S109, the conventional memory card host device 13 sets the capacity expressed by the internal register 164 as usable, and the capacity setting process is completed in Step S110.

In the case of the combination of the capacity switching-type memory card host device 12 and the conventional memory card, the process advances to Step S106. The capacity switching-type memory card host device 12 refers to the fact that the large-capacity expression register use flag 166 is not flagged from the response to the internal register information retrieval command received in Step S104, and thereby authenticates the memory card as being a conventional memory card 33. Accordingly, the capacity switching-type memory card host device 12 authenticates the capacity expression of the internal register 173 in Step S106. Next, in Step S107, the capacity switching-type memory card host device 12 reads the master boot sector 171. In Step S108, the capacity switching-type memory card host device 12 authenticates the single partition 172 from the single partition information. Thereafter, in Step S109, the capacity switching-type memory card host device 12 sets the capacity expressed by the internal register 173 as usable, and the capacity setting process is completed in Step S110.

Here, description will be made regarding a mechanism that the capacity switching-type memory card 32 causes the conventional memory card host device 13 not to authenticate the second partition information in the master boot sector 161 in the case of the combination of the conventional memory card host device 13 and the capacity switching-type memory card 32. This mechanism is applied to the process in Step S108.

Figure 5:
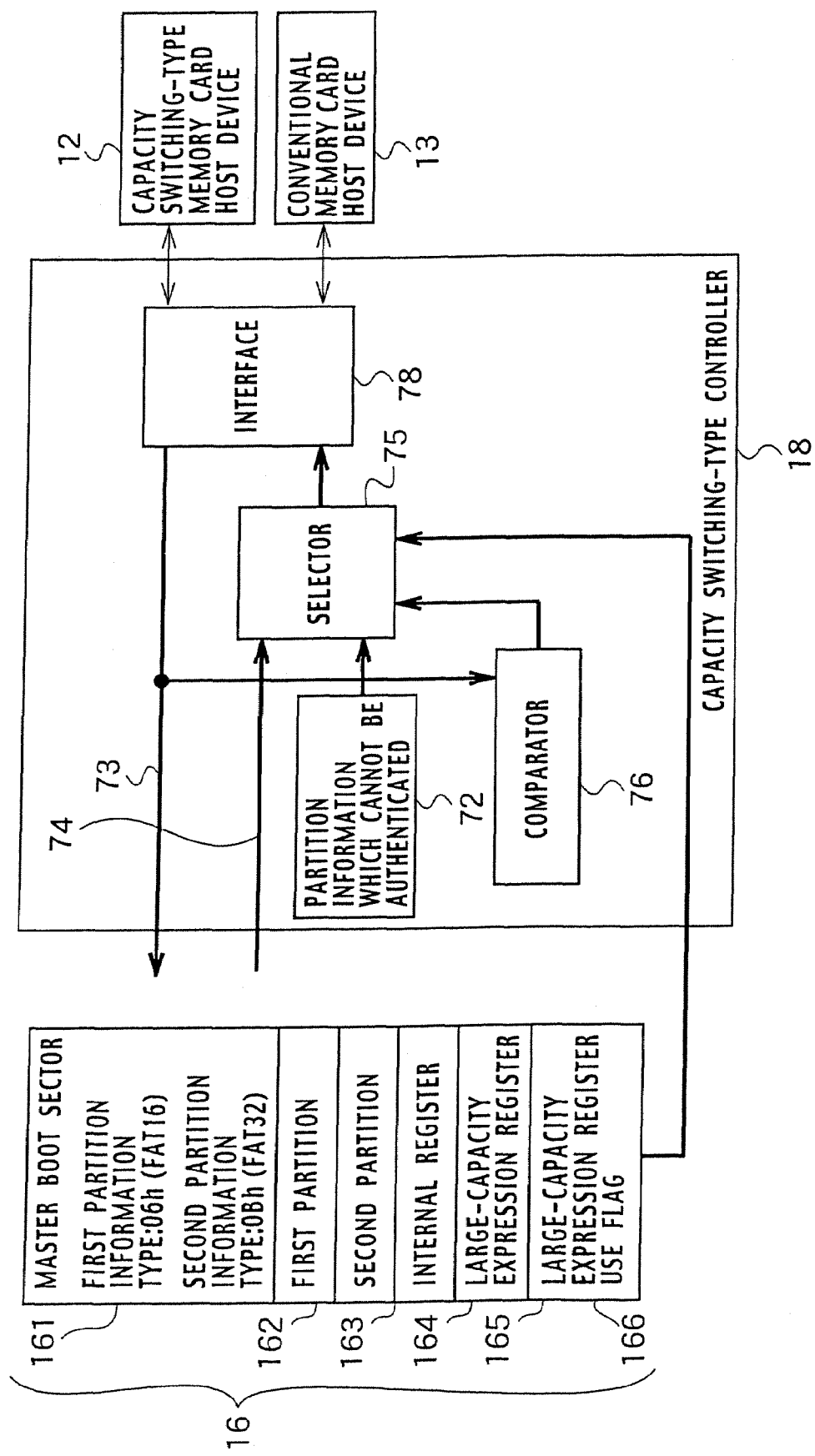
FIG. 5 is a block diagram showing a configuration of a capacity switching-type controller of the capacity switching-type memory card according to the embodiment of the present invention.

As shown in FIG. 5, the capacity switching-type controller 18 of the capacity switching-type memory card 32 includes an interface 78 which connects the memory card host device to the capacity switching-type internal storage element 16, a comparator 76 connected to the interface 78, and a selector 75 connected to the comparator 76. The interface 78 is connected to the capacity switching-type internal storage element 16 through an address bus 73. The comparator 76 receives an access destination to the capacity switching-type internal storage element 16 from the interface 78. The selector 75 selects any of output data 74 from the capacity switching-type internal storage element 16 and partition information 72 which cannot be authenticated by the conventional memory card host device 13, based on information from the comparator 76 and the state of the large-capacity expression register use flag 166. Then, the selector 75 transmits the selected one to the interface 78.

The condition that the selector 75 selects the unauthenticatable partition information 72 occurs when a condition of the comparator connected to the address bus 73 is satisfied and the large-capacity expression register use flag 166 is not used at the same time. The condition to satisfy the comparator 76 is when there is access to the capacity switching-type internal storage element 16 to obtain the second partition information in the master boot selector 161, for example. In this way, when the conventional memory card host device 13 tries to obtain the second partition information, the unauthenticatable partition information 72 will be transmitted to the interface 78. Accordingly, the conventional memory card host device 13 cannot authenticate the existence of the second partition 163 from the second partition information. Upon access other than the access to obtain the second partition information, the output data 74 of the capacity switching-type internal storage element 16 is outputted to the interface 78. Therefore, there is no influence on the data other than the second partition information.

Figure 3:
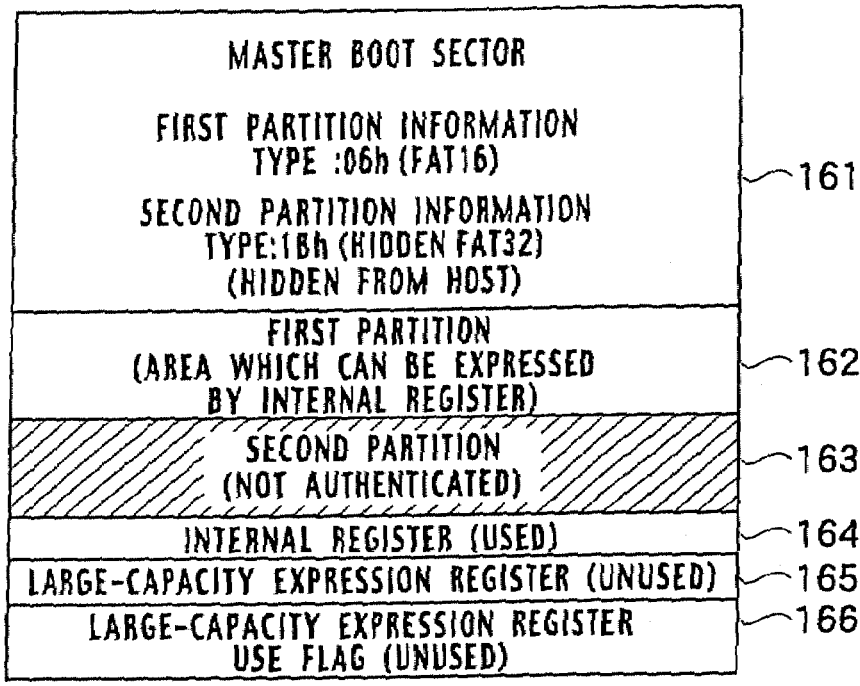
FIG. 3 is a schematic view showing a state of a capacity switching-type memory card according to the embodiment of the present invention, which is used in combination with a conventional memory card host device.

FIG. 3 shows a state of the capacity switching-type internal storage element 16 of the capacity switching-type memory card 32 when the capacity switching-type memory card 32 is used in combination with the conventional memory card host device 13. The partition type which constitutes the "unauthenticatable second partition information" in the master boot sector 161 is not the original "0Bh" (FAT 32). Instead of this, the type "1Bh" (hidden FAT 32), for example, is selected by the selector 75. In this way, the second partition information is authenticated as the "1Bh" by the conventional memory card host device 13, and the second partition 163 is not authenticated by the conventional memory card host device 13. Meanwhile, the internal register 164 is used as the register for indicating the capacity, and the large-capacity expression register 165 and the large-capacity expression register use flag 166 are not used.

Figure 4:
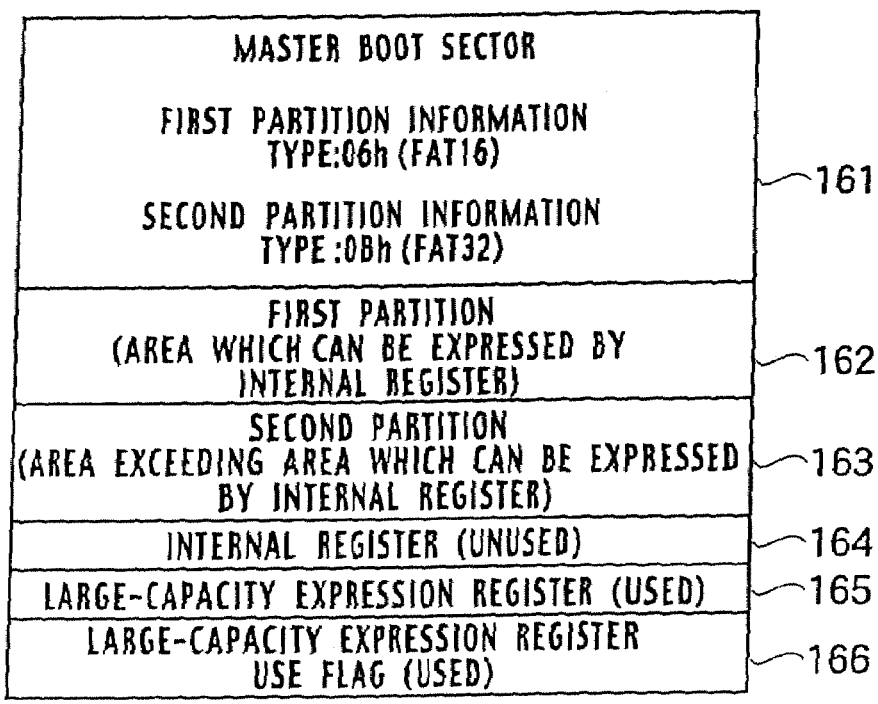
FIG. 4 is a schematic view showing a state of the capacity switching-type memory card according to the embodiment of the present invention, which is used in combination with a capacity switching-type memory card host device.

On the other hand, FIG. 4 shows a state of the capacity switching-type internal storage element 16 of the capacity switching-type memory card 32 when the capacity switching-type memory card 32 is used in combination with the capacity switching-type memory card host device 12. The first partition information and the second partition information in the master boot sector 161 are transmitted to the capacity switching-type memory card host device 12 without modification. Accordingly, the first partition 162 and the second partition 163 are authenticated by the capacity switching-type memory card host device 12. The large-capacity expression register 165 is used as the register indicating the capacity, and the capacity information in the internal register 164 is not used. Meanwhile, the large-capacity expression register use flag 166 is used.

The storage capacity setting method according to the embodiment of the present invention adopts the capacity expression by the conventional internal register and the new capacity expression, and uses the plurality of capacity expressions while switching between the capacity expressions. Moreover, according to the storage capacity setting method according to the embodiment of the present invention, the host device group 1 and the memory card group 3 can operate without problems and maintain compatibility in any combination of: the capacity switching-type memory card host device 12 and the capacity switching-type memory card 32; the capacity switching-type memory card host device 12 and the conventional memory card 33; and the conventional memory card host device 13 and the capacity switching-type memory card 32.

According to the embodiment of the present invention, it is possible to provide the memory card authentication system, the capacity switching-type memory card host device, the capacity switching-type memory card, the storage capacity setting method, and the storage capacity setting program, which can adopt the capacity expression by the conventional internal register and the new capacity expression, and make use of the plurality of capacity expressions while switching between the capacity expressions.

OTHER EMBODIMENTS

Although the present invention has been described above with reference to the embodiment, it is to be understood that the present invention shall not be limited to the descriptions and the drawings which constitute part of this disclosure. It is obvious to those skilled in the art that various modifications, alterations, and improvements become possible from the teachings of this disclosure.

For example, the capacity switching-type memory card 32 according to the embodiment of the present invention has been described with the drawings which include the two partitions (storage areas) 162 and 163. However, needless to say, the memory card 32 may include more than two partitions. In such a case, information on each of the partitions will be saved in the master boot sector 161.

Various modifications will become possible for those skilled in the art after receiving the teachings of the present disclosure without departing from the scope thereof.

The invention claimed is:

1. A storage device configured to be connectable to a host device, the storage device comprising:
a storage element configured to include a first storage area managed by a first file system and a second storage area managed by a second file system;
a first register configured to retain information on a storage capacity of the first storage area;
a second register configured to retain information on a storage capacity exceeding the storage capacity of the first storage area; and
a controller configured to control the storage element, wherein the controller receives an initialization command from the host device.

2. The storage device of claim 1, wherein the controller receives notification that the host device handles the storage device, as part of an argument of the initialization command.

3. The storage device of claim 2, wherein the host device, which handles the storage device, accesses both of the first and second storage areas.

4. The storage device of claim 1, wherein the controller permits that the host device accesses the second storage area when the controller receives notification that the host device handles the storage device.

5. The storage device of claim 1, wherein the controller notifies a flag to the host device when the controller receives information that the host device handles the storage device.

6. The storage device of claim 5, wherein the controller notifies the flag to the host device, as part of an argument of a response to a register information retrieval command received from the host device.

7. The storage device of claim 6, wherein the argument of the response to the register information retrieval command includes any of 127 bits and 32 bits.

8. The storage device of claim 5, wherein the controller comprises:
- an interface connected to the storage element through an address bus;
- a comparator configured to receive an access destination to the storage element from the interface; and
- a selector configured to select any of output data from the storage element and partition information which cannot be authenticated by the host device, based on information from the comparator and the flag, and transmit any of the data and the information thus selected to the interface.

9. The storage device of claim 1, wherein the first file system is the FAT 16 file system and the second file system is the FAT 32 file system.

10. The storage device of claim 1, wherein an argument of the initialization command includes 32 bits.

11. The storage device of claim 1, further comprising a master boot sector configured to retain file information of the first and second storage areas.

12. The storage device of claim 1, wherein the storage device has dimensions of 24×32×2.1 mm; and
- wherein the storage device includes a copyright protection function compliant with a secure digital music initiative standard.

* * * * *